Aug. 16, 1966  V. I. MJAGKOV ETAL  3,267,195

AIRCRAFT RADAR SIMULATOR

Filed June 18, 1964  2 Sheets-Sheet 1

United States Patent Office 3,267,195
Patented August 16, 1966

3,267,195
AIRCRAFT RADAR SIMULATOR
Vadim Ivanovich Mjagkov, Ul. Aviatsionnaja, 13, Apt. 203, Leningrad; Nickolai Ivanovich Grigorjev, 1st Khoroshevsky Pr., 214, Apt. 4, Moscow; Vladimir Alexeevich Grosman, Nevsky Pr.-Kt., 93, Apt. 22, Leningrad; Evgeny Alexandrovich Durnov, Ul. Frunze, 17, Apt. 66, Leningrad; Vladimir Leonidovich Koblov, Pr. Gagarina, 35, Apt. 27, Leningrad; Militsa Victorovna Kozlova, 7th Sovetskaja Ul., 35, Apt. 32, Leningrad; and Grigory Naumovich Shtapel, Ul. Basseinaja, 79, Apt. 47, Leningrad, all of U.S.S.R.
Filed June 18, 1964, Ser. No. 376,015
6 Claims. (Cl. 35—10.4)

The present invention relates to radar simulators providing for artificial generation of electronically formed target marks of air obstacles, such as aircraft proceeding along another course, mountains, and thunder storms, and for simulating the operation of the receiver-transmitter and antenna units of a radar station with the help of electronic and electromechanical means.

It is known that in simulating high-frequency units (receiver-transmitters and antenna) radar simulators presently in use employ an ultrasonic oscillator whose antenna is placed in a bath with distilled water in which target dummies are also placed, target marks being obtained directly by converting ultrasonic oscillation echoes of said dummies placed in said bath, said echoes being received by said ultrasonic oscillator antenna, then amplified and converted into video signals of target marks supplied to the radar indicator.

The disadvantages of these presently used ultrasonic oscillators consist in that they are rather difficult to be constructed and operated, require simulated targets restricted to the operational area, and they do not provide for simulating such air targets as aircraft and thunder storms.

The proposed simulator employs merely an electronic circuit, with the units of the simulated radar station being used, the high-frequency units being replaced by their low-frequency equivalents.

The proposed simulator is designed for training flying personnel in operating the aircraft radar stations and in solving navigational problems based on radar information obtained.

It is an object of the present invention to provide a radar simulator which would enable training of flying personnel in ground conditions thereby affording safety to the trainees, cutting down expenses on training and introducing simulative faults into the radar for developing skill of the trainees in trouble-shooting.

In accordance with the above-mentioned and other objects of the invention the simulator comprises a new device and a combination of parts and elements thereof which is herein and hereinafter described and presented in the claims. Besides, it will be understood that changes in the exact embodiment of the invention herein disclosed may be made within the scope of this invention without departing from the spirit of the invention.

Other objects and advantages of the invention will be more apparent upon a consideration of the following description and the accompanying drawings, wherein.

Figure 1:
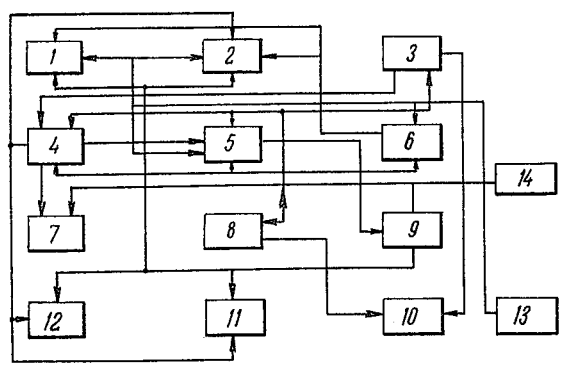
FIG. 1 is a functional diagram of a radar simulator.

The radar simulator shown in FIG. 1 consists of a number of units which by their functional purpose may be divided into the following four groups: group 1 includes the radar station units such as pilot's indicator 1, navigator's indicator 2, and control panel 3, all these units being located in the radar simulator like real ones in the cockpit; group 2 includes the radar station units such as synchronizer 4, sweep unit 5, and power supply unit 6, all these units providing for the operation of the units of group 1; group 3 includes the units of the proposed simulator such as obstacle simulator 7, comprising a number of units, receiver-transmitter unit and active jamming signal simulator 8, antenna unit simulator 9 (shown in greater detail at 22 in FIG. 2), all these units providing for simulating the high-frequency part of the radar station, as well as for simulating air obstacles, echo marks of mountains, thunder storms, aircraft, and for simulating an active jamming source; group 4 includes such units of the proposed simulator, as radar mode control panel 10, stand-by pilot's indicator panel 11, stand-by navigator's indicator panel 12, radar fault simulative panel 13, obstacle range, azimuth and angle-of-sight control panel 14 which makes it possible for an instructor to create an air situation, to control the quality and speed of operation of the trainee, and to introduce simulated faults into the radar station.

Synchronizer 4 generates pulses synchronizing the operation of the pilot's and navigator's indicators, the sweep unit, and the obstacle simulator, as well as forms calibration range marks.

Control panel 3 provides for the following: selecting the necessary operating mode and sweep range on the indicator, switching on high voltage, changing over from oscillator automatic frequency control to manual frequency control, and control of voltages generated by the power supply unit. Additionally, it provides for control of magnetron and mixer crystals currents, and of the antenna tilt.

Pilot's indicator 1, navigator's indicator 2 and their stand-by units mounted at the instructor's station provide for observing the air situation visualized in the form of electronic marks simulating echo signals of mountains, thunder storms, aircraft, and active jamming.

Figure 2:
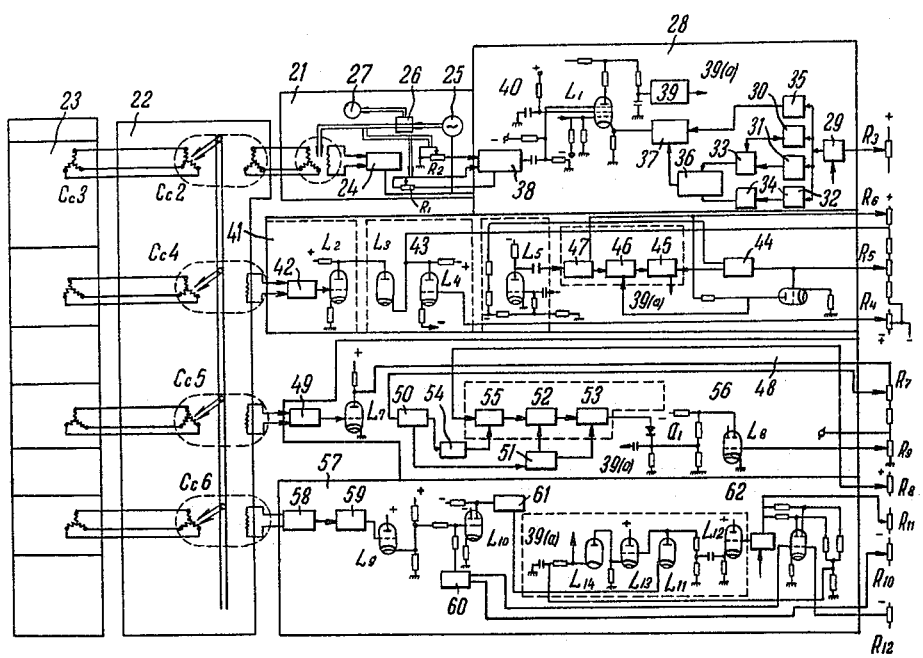
FIG. 2 is a circuit diagram of such devices forming the simulator as a drift angle measuring channel simulator, a shift angle measuring error indicator, a mountain echo mark simulator, a thunder storm echo mark simulator, an aircraft echo mark simulator, a part of a circuit of an antenna unit simulator, and a part of a circuit of programming devices.

Obstacle simulator 7, comprising units 41, 48, 57 produces the marks simulating echo signals of mountains (three marks), of thunder storms (two marks), and of an opposite course aircraft (one mark). The size and form of these marks vary depending on range, angle of sight in the vertical plane, and antenna tilt angle, the form and character of said marks corresponding to natural radar marks. Simulator 7 also includes drift angle measuring channel simulating circuit 28 (FIG. 2).

The receiver-transmitter unit simulator 8 (shown in greater detail at 63 in FIG. 3) generates voltages simulating the current of magnetron 64 the currents of crystals 72 of an intermediate frequency amplifier, and the pressure of the air that component 65 is intended to simulate. In addition, the simulator 8 imitates AFC circuit 69, a signal value control system for control of the value of signals supplied to the screens of indicators (said value varying depending on the accuracy of tuning the oscillator), and an active jamming simulating circuit 76.

Antenna unit simulator 9 allows simulating the scanning of sweep line of indicators within the limits of ±90 degrees, generates pulses controlling the formation of signals of obstacles at coincidence of the antenna tilt angle with the azimuth of these obstacles, and makes it possible to displace manually the sweep line in azimuth in drift angle measuring mode.

By means of control panel 10 the instructor can watch, observing the pilot lamps, the position of any of the controls set by the trainee on the radar control panel. Said panel 10 also indicates the value of a drift angle error measured by the trainee.

Using the radar fault simulative panel 13, the instructor can introduce faults interfering with the normal operation of the radar station, which may be eliminated by the trainee just from his seat during "the flight."

Obstacle control panel 14 mounts transmitters controlling the simulated obstacles in range, azimuth and angle of sight, as well as switching on the circuit of a respective obstacle and a drift angle transmitter. Using these transmitters, the instructor creates a desired air situation by switching on the circuits of the obstacles, introduced and by setting range, azimuth, and angle of sight.

A drift angle measuring error indicator 21 (FIG. 2) comprises selsyn-receiver CC1 electrically coupled with differential selsyn CC2 placed in an antenna unit simulator 22 and turning through an angle equal to that of the drift measured.

Other windings of differential selsyn CC2 are electrically connected to selsyn-transmitter CC3 mounted in programming device 23 and turning through the true drift angle. Thus, at the output of selsyn-receiver CC1 appears a signal, when the values of the true and measured drift angles are different. The output winding of said selsyn-receiver is connected to the input of a follow-up amplifier 24, whose output is, in turn, connected to the control winding of a follow-up motor 25.

With a signal at the input of amplifier 24, motor 25 starts rotating and turns the axle of selsyn-receiver CC1 via reduction gear 26 until the signal disappears at the output winding of said selsyn-receiver; in which case the pointer of dial 27 linked with the axle of motor 25 turns and indicates the value of an error in degrees between the true and measured drift angles. At the same time the sliders of potentiometers R1 and R2 turn through the angles proportional to the drift angle measuring error.

Drift angle measuring channel simulator 28 involves phantastron 29 triggered by a pulse supplied from the synchronizer (not shown in the drawing) and controlled in range from programming device 23 by means of potentiometer R3, the slide of which travels proportionally to the antenna tilt angle.

Figure 3:
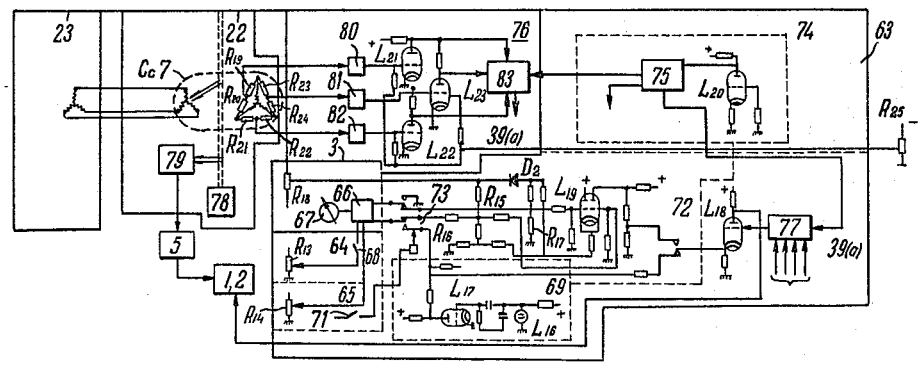
FIG. 3 is a more detailed diagram of a receiver-transmitter unit simulator, an antenna unit simulator, and an active jamming signal simulator.

By its trailing edge, phantastron 29 drives four different-duration multivibrators 30, 31, 32 and 35. Multivibrators 30, 31, 32 drive by the pulse trailing edge blocking generators 33 and 34 whose pulses participate in shaping the signal simulating ground echoes. The pulse shaped by multivibrator 35 takes part in generation of a simulating signal as well. Mixing of all the signals is carried out in mixers 36 and 37, after which a pulse train of four pulses is applied to selector 40 employing valve L1. To this selector are also applied noise from noise simulator 74 (FIG. 3) and voltage from RC-generator 38, said voltage modulating the simulating signal in amplitude. From the output of said selector the shaped signal is transmitted through an amplifier and cathode follower 39 to signal modulation circuit 39a (FIG. 3) and then to indicators 1 and 2 (FIG. 3).

A signal is modulated in amplitude in selector 40 employing valve L1 due to voltage beats of RC-generator 38 at a frequency repetition rate of the simulated signal. The beat frequency is determined by the differential frequency of these signals and depends on the amount of detuning of RC-generator 38 from the nominal. The amount of detuning is defined by the angle of turning of the slides of potentiometers R1 and R2, and depends on the value of the drift angle measuring error.

Thus, the greater the drift angle measuring error, the more the signal modulation frequency observed by the operator on indicator 2 (FIG. 1) differs from the minimum, and taking into consideration the fact that the operator determines the drift angle value by the least modulation frequency, the error of determining the drift angle is minimized.

Mountain echo mark simulator 41 imitating mountain echo marks on the indicator screen comprises cathode detector 42 to the input of which is applied a voltage from the output winding of selsyn-receiver CC4 mounted in antenna unit simulator 22, setting the location of the mark in azimuth from the output of cathode detector 42, the envelope of this voltage being applied to the input of an amplifier employing valve L2.

At the output of said amplifier is formed a bell-shaped pulse corresponding to the moment of passing through zero of the envelope of voltage of selsyn CC4. The bell-shaped pulse is applied to tilt angle-mark control circuit 43. Said circuit comprises diode L3 controlling the voltage obtained from control valve L4. The voltage at the output of the control valve is determined by the value of the potential taken from potentiometer R4 providing for the control in mountain's angle of sight corrected for the antenna tilt angle. The more the angle of sight differs from zero, the higher negative potential will be applied from potentiometer R4 to control valve L4, and the less conductive this valve will be. As a result the positive potential obtained from the anode of control valve L4 will be higher, and, hence, diode L3 will be less conductive, the value of the bell-shaped pulse and, consequently, the mountain echo mark will decrease. From the output of diode L3 the bell-shaped pulse is fed to mark size range control potentiometer R5.

From the output of this potentiometer a corresponding portion of the pulse is fed to the input of the amplifier of modulator 44 of phantastron 45 and to the modulation control circuit of phantastron 46, said circuit employing valve L6.

From the amplifier of said modulator 44 a pulse is also applied to a selector employing valve L5, said pulse making said selector conductive for the time of shaping the mountain echo mark so as to pass the trigger pulses of phantastron 47 which are delivered to the same selector.

Thus phantastron 47 is triggered for the time of shaping the mark, and is width-controlled by range potentiometer R6 located in programming device 23. The trailing edge of a pulse supplied from phantastron 47 drives phantastron 46.

The form of the leading edge of the mark is determined by pulse width modulation of phantastron 46 depending on azimuth. The trailing edge of this pulse triggers phantastron 45. Modulation of phantastron 46 is effected by valve L6, and it varies with range due to the supply of the anode of valve L6 from range potentiometer R6. The mark proper is formed by the pulse of phantastron 46.

To shape the mark as close to the actual one as possible, the part of phantastron 45 forming the trailing edge of the mark is modulated in range by a modulator whose output voltage varies also with range. From the output of phantastron 45 pulses shaping the marks are transmitted to signal modulation circuit 39a (FIG. 3) and then to indicators 1 and 2 (FIG. 3).

If necessary to simulate several mountain echo marks, the number of the hereinbefore described devices should be increased.

Thunder storm simulator 48 imitating radar echo marks of thunder storms on the indicator screen comprises cathode detector 49 to the input of which voltage is fed from the output winding of selsyn-receiver CC5 installed in antenna unit simulator 22 and setting the location of the mark in azimuth.

From the output of cathode detector 49 the envelope of this voltage is applied to the input of amplifier L7. At the output of the amplifier a bell-shaped pulse is formed the width of which corresponds to the moment the envelope of this voltage passes through zero. Said bell-shaped pulse is fed to range potentiometer R7 set in programming device 23.

From the slide of this potentiometer the appropriate part of this pulse is transmitted to the input of the final stages of control pulse shaping circuit 50. From the output of this circuit the amplified pulse is fed to modulating voltage amplifier 51 of phantastrons 52 and 53 as well as to trigger pulse selector 54 of phantastron 55.

During the arrival of the control pulse, selector 54 passes trigger pulses of phantastron 55. To said phantastron 55 from range potentiometer R8 located in programming device 23 is applied a voltage, controlling the width of the pulse supplied from phantastron 55 proportionally to range.

The trailing edge of the pulse of phantastron 55 triggers phantastron 52, while the trailing edge of the pulse of phantastron 52 triggers phantastron 53.

To shape the thunder storm echo mark as close to the actual one as possible, the width of the pulse supplied by phantastrons 52 and 53 is modulated through modulating voltage amplifier 51. The pulse of phantastron 53 used for creating the mark is fed to circuit 39a providing for modulation of signals depending on angle of sight corrected for the antenna tilt angle generated by stage 56 employing valve L8. Crystal diode D1 is fed, on the one hand, with pulses carried from the output of phantastron 53 and, on the other hand, with a control voltage supplied from control valve L8. The input of the control valve is supplied with voltage obtained from potentiometer R9 of the angle of sight corrected for the antenna tilt angle, said potentiometer being located in programming device 23.

The more the angle of sight differs from zero, the higher cut-off potential is applied to control valve L8 and the higher potential is fed for cutting off diode D1, and, consequently, the lower the pulses taken from the output of diode D1. These pulses are supplied to signal modulation circuit 39a (FIG. 3), and then to indicators 1 and 2 (FIG. 3).

If necessary to simulate several thunder storm echo marks, a number of the hereinabove described devices should be increased.

Simulator unit 57 imitating radar echo marks of an opposite course aircraft on the indicator screen comprises cathode detector 58 whose input is fed with a voltage supplied from the output winding of selsyn-receiver CC6 installed in the antenna unit simulator setting the location of the echo mark in azimuth.

From the output of cathode detector 58 the envelope of this voltage is applied to the input of amplifier 59 from which output a bell-shaped pulse is fed through a cathode follower employing valve L9 to the input of a coincidence pulse circuit employing valve L10.

The grid of this valve L10 is also supplied with a constant voltage delivered through cathode follower 60 from range potentiometer R10 installed in programming device 23. The greater the range, the more the value of bias applied to the grid of valve L10, and the less the pulses taken from its anode and transmitted through matching stage 61 to diode L11. The filling pulses of the simulated mark are generated by amplifying the trailing edge of a pulse of a phantastron located in shaping circuit 62 and controlling the voltage proportional to range, said voltage being obtained from potentiometer R11 placed in programming device 23.

The shaped filling pulses are supplied through a cathode follower employing valve L12 to a modulator employing diode L11, said modulator interrupting its shunting action only for the moment when the disabling bell-shaped coincidence pulse arrives.

Control of said modulator in range and tilt angle corrected for angle of sight is carried out by cutting off diode L14 by the voltage obtained from a range and angle of sight control stage employing valve L15.

One grid of the stage using valve L15 is fed with a voltage proportional to range, said voltage being taken off cathode follower 60 and supplied from potentiometer R10 mounted in programming device 23; the other grid of the stage with valve L15 is fed with a voltage proportional to the angle of sight of the simulated aircraft, said voltage being applied from potentiometer R12 mounted in programming device 23.

With range or angle of sight increasing, valve L15 becomes less conductive and the voltage at its anode rises, and, consequently, diode L14 fed with this voltage becomes less conductive as well and pulses taken from the output of this diode decrease.

From the output of diode L14 the pulses shaping the echo mark are transmitted to signal modulation circuit 39a (FIG. 3), and then to indicators 1 and 2 (FIG. 3).

If it is necessary to obtain several echo marks of an opposite course aircraft, the number of the herein-before described devices should be increased.

Receiver-transmitter unit simulator 63 illustrated in FIG. 3 comprises magnetron current simulator 64 and air pressure simulator 65, both devices employing a potentiometer-coupled circuit with resistors R13 and R14 respectively, said circuit being connected through selector switch 66 to an indicator mounted on control panel 3. The values of voltages obtained from potentiometers R13 and R14 are selected so that indicator 67 will show the value of the simulated magnetron current and the value of air pressure, said values corresponding to those of the real radar station. The simulated magnetron voltage is applied to indicator 67 only when HIGH VOLTAGE tumbler switch 68 is on.

Automatic frequency control circuit simulator 69 comprises a slow sawtooth generator employing a neon glow lamp L16 and an amplifier employing valve L17. From the output of the amplifier, voltage is supplied to signal modulation circuit 39a employing valve L18 and then through tumbler switch 66 to the indicator 67. These voltages are taken from the automatic frequency control circuit simulator when tumbler switch 71 is set to the position AFC.

Klystron oscillator simulator 72 comprises a potential bridge using resistors R15, R16, and R17, one arm of said potential bridge having a non-linear element (a crystal diode D2). In adjusting by potentiometer R18, the linear voltage obtained from this potentiometer is fed to one diagonal of said potential bridge, while from the other diagonal of the bridge is picked off a voltage varying in compliance with the triangle law. This voltage is supplied through switch 73 to indicator 67 thus imitating the mixer crystal current in manual frequency control mode, and to a differential stage employing valve L19, the voltage being taken from the output of said stage varying also in compliance with the same law but relative to ground. From the output of valve L19 voltage is supplied to the cathode of valve L18. The operating conditions of valve L19 are chosen so, that valve L18 becomes conductive to pass the signal only at the moment of maximum triangular voltage, this corresponding to the optimum tuning of the simulated klystron and to the maximum value of simulated mixer crystal current.

Receiver noise simulator 74 comprises a thyratron noise generator employing valve L20 and a band-pass noise amplifier 75. The operating conditions of the thyratron generator and band-pass noise amplifier 75 are selected so, that the noise spectrum at the output of amplifier 75 should resemble the real one. From the output of band-pass amplifier 75 the noise voltage is applied to active jamming signal simulator 76, drift angle measuring channel simulator 28 (FIG. 2), and to signal mixer 77.

Antenna unit simulator 22 consists of a motor and a mechanism limiting the swiveling of simulator axle 78 within the limits of ±90 degrees, said motor and said mechanism being linked with rotary transformer 79 and selsyn-receivers CC2, CC4, CC5, and CC6 which serve as simulated target azimuth location and active jamming signal transmitters, and with a measured drift angle value differential selsyn CC7.

Rotary transformer 79 and sweep unit 5 are supplied with sawtooth voltage which is divided in said rotary transformer into two voltages modulated in amplitude in compliance with the sine and cosine law, proportionally to the tilt angle of the antenna unit simulator axle. From the output of rotary transformer 79 these two modulated voltages are applied to the corresponding windings of the deflecting system of indicators 1 and 2 thus forming at them a sector sweep being in synchro with the swiveling of the axle (not shown in the circuit) of the antenna unit simulator.

All the selsyn-receivers arranged in the simulator are electrically coupled with the selsyn-transmitters arranged in programming device 23, the axles of the said selsyn-transmitters being turned through an angle equal to the azimuth angle (corrected for the drift angle) of turn of the simulated target relative to the imaginary axis of the simulated "aircraft." The windings of the selsyn-transmitters are fed with A.C., 400 c.p.s. voltage.

In order to trigger the obstacle echo mark simulating circuits a pulse is used, formed of the envelope voltage at the output of the selsyn-receiver and coinciding in time with the moment this voltage is passing through zero.

The measured drift angle value differential selsyn CC2 is electrically coupled to a drift angle true value selsyn-transmitter CC3 located in the programming device 23 and to selsyn-receiver CC1 arranged in drift angle error indicator mounted on the instructor's control panel 13. Differential-selsyn CC2 is mechanically connected to the rotation axle of antenna unit simulator 22, and is rotated at the moment of measuring a drift angle through the drift angle measured by the operator.

Active jamming signal simulator 76 comprises voltage envelope amplifiers employing valves L21, L22, and L23. The amplified voltages are taken from voltage dividers R19–R24 of the output winding of differential selsyn CC7 arranged in antenna unit simulator 22. Voltage dividers R19–R24 are selected so that the voltages taken will be biased by 60 electrical degrees. These voltages are detected in cathode detectors 80, 81, and 82, and then are transmitted to the amplifiers employing valves L21, L22, and L23. The width of the beams sent by the active jamming sources is controlled in range by the bias supplied from the programming device to the grids of the amplifiers.

The bias voltage is taken from potentiometer R25 and varies proportionally to range. The nearer to the active jamming source, the less the bias, and, consequently, the wider the beam. From the output of the amplifiers the signal envelope voltages are supplied to circuit 83 shaping the filling pulses, said circuit being furnished with the voltage fed from the noise generator employing valve L20. At the output of circuit 83 there will be three broad sectors filled with noise and shifted in time relative to one another by the value equal to the time the antenna unit simulator takes to turn through 60 degrees.

As a result, on the indicator of the radar station three illuminated sectors will be observed, shifted by 60 degrees with respect to each other, varying in width depending on the "active jamming source" range, and travelling in azimuth depending on the "aircraft's" maneuvering.

What is claimed is:

1. An aircraft radar simulator for training flying and navigating personnel in operating the aircraft radar station, comprising a radar receiver-transmitter unit simulator including a manual frequency controlled klystron oscillator simulator employing a differential bridge circuit, one arm of said differential bridge being provided with a non-linear element, said differential bridge being coupled to a manual frequency control knob located on a radar control panel; an AFC simulator consisting of a slow sawtooth generator switched on from said radar control panel; a noise simulator comprising a thyratron generator and a band-pass amplifier; a magnetron current simulator and a pressure signalling simulator employing a potentiometer transmitter circuit; a simulator comprising target azimuth selsyn-transmitters connected to a programming device controlling the movement of targets and mechanically linked through a reduction gear with a sweep rotary transformer and a radar antenna unit azimuth swinging motor; simulators imitating radar echo marks of an opposite course aircraft, mountains, thunder storms, and an active jamming source; a drift angle measuring channel simulator; a signal modulation unit which receives signals supplied from said target mark simulators and a control voltage fed from said receiver-transmitter unit simulator; radar station indicators receiving signals supplied from said signal modulation unit; a programming device supplying control voltages to said antenna unit simulator and said target echo mark simulators; a radar station control panel supplied with voltage fed from said receiver-transmitter unit simulator; and a control panel for checking said radar simulator.

2. An aircraft radar simulator for training flying and navigating personnel in operating the aircraft radar station, comprising a radar receiver-transmitter unit simulator; a radar antenna unit simulator comprising target azimuth selsyn-transmitters connected to a programming device controlling the movement of the targets and mechanically linked through a reduction gear with a sweep rotary transformer and an azimuth swinging motor; simulators imitating radar echo marks of an opposite course aircraft, mountains, thunder storms, and an active jamming source; a drift angle measuring channel simulator; a signal modulation simulator receiving signals supplied from said target echo mark simulators and control voltage fed from said receiver-transmitter unit simulator; radar station indicators receiving signals supplied from said signal modulation unit; a programming device supplying control voltages to said antenna unit simulator and said target echo mark simulators; a radar station control panel supplied with voltage fed from said receiver-transmitter unit simulator; and a control panel for checking said radar simulator.

3. An aircraft radar simulator for training flying and navigating personnel in operating the aircraft radar station, comprising: radar receiving-transmitter and antenna unit simulator; an aircraft echo mark simulator comprising a coincidence pulse shaping circuit controlled by a selsyn-transmitter mounted in said antenna unit simulator and connected to a programming device, said coincidence pulse shaping circuit being also connected to a modulator coupled with a filling pulse shaping circuit and a range and tilt angle signal value control circuit coupled to said programming device; mountain, thunder storm, and active jamming source radar echo mark simulators; a drift angle measuring channel simulator; a signal modulation unit receiving signals supplied from said target echo mark simulators and control voltage fed from said receiver-transmitter unit simulator; radar station indicators supplied with signals sent from said signal modulation unit; a programming device supplying control voltages to said antenna unit simulator and said target echo mark simulators; a radar station control panel supplied with voltage fed from said receiver-transmitter unit simulator; and a control panel for checking said radar simulator.

4. An aircraft radar simulator for training flying and navigating personnel in operating the aircraft radar station, comprising a radar receiver-transmitter and antenna unit simulator; a mountain echo mark simulator comprising a control pulse shaping circuit coupled to a selsyn-transmitter mounted in said antenna unit simulator and connected to a programming device and to a mountain echo mark filling pulse shaping circuit connected to a control circuit and modulating stages employing phantastrons which control a filling circuit in accordance with the law of change of mountain mark shape on the screen of said indicator depending on the range and angle of sight which data is supplied to said modulating stages from said programming device; aircraft, thunder storm, and active jamming source radar echo mark simulators; a drift angle measuring channel simulator; a signal modulation unit receiving signals supplied from said target mark simulators and control voltage fed from said receiver-transmitter unit simulator; radar station indicators supplied with signals from said signal modulation unit; said programming device supplying control voltages to said antenna unit simulator and said target mark simulators; a radar station control panel furnished with voltage supplied from said receiver-transmitter unit simulator; and a control panel for checking said radar simulator.

5. An aircraft radar simulator for training flying and navigating personnel in operating the aircraft radar station, comprising a receiver-transmitter and antenna unit simulators; a thunder storm radar echo mark simulator including a control pulse shaping circuit coupled to a selsyn-receiver arranged in said antenna unit simulator connected through a differential selsyn to a programming device, said control pulse shaping circuit being connected to a thunder storm front image shaping channel containing phantastrons controlled by the modulating voltage and by voltages proportional to the range, angle of sight, and antenna tilt angle transmitted from said programming device; aircraft, mountain, and active jamming source radar echo mark simulators; a drift angle measuring channel simulator; a signal modulation unit receiving signals supplied from said target mark simulators and the control voltage fed from said receiver-transmitter unit simulator; radar station indicators supplied with signals sent from said signal modulation unit; said programming device supplying control voltages to said antenna unit simulator and said target mark simulators; a radar station control panel furnished with the voltage supplied from said receiver-transmitter unit simulator; and a control panel for checking said radar simulator.

6. An aircraft radar simulator for training flying and navigating personnel in operating the aircraft radar station, comprising: a receiver-transmitter and antenna unit simulator; an active jamming source simulator consisting of a selsyn-receiver connected to a programming device and arranged in said antenna unit simulator for supplying three control voltages shifted by 60 electrical degrees with respect to each other to a control pulse shaping circuit connected to said programming device in the part of range control, as well as to a filling pulse shaping circuit receiving also signals fed from a noise generator; aircraft, mountain, thunder storm, and active jamming source radar echo mark simulators; a drift angle measuring channel simulator employing a phantastron generating pulses with a duration proportional to antenna tilt angle and controlling multivibrators triggering blocking generators connected through mixers with a selector coupled to said noise generator and to a RC-generator producing signals imitating second Doppler frequency signals; a signal modulation unit receiving signals supplied from said target mark simulators and control voltage fed from said receiver-transmitter unit; radar station indicators supplied with signals sent from said signal modulation unit; a programming device supplying control voltages to said antenna unit simulator and said target mark simulators; a radar station control panel furnished with voltage supplied from said receiver-transmitter unit simulator; and a control panel for checking said radar simulator.

References Cited by the Examiner

UNITED STATES PATENTS

| | | | |
|---|---|---|---|
| 2,555,442 | 6/1951 | Hales | 35—10.4 |
| 2,774,149 | 12/1956 | Garman et al. | 35—10.4 |
| 2,937,456 | 5/1960 | Bollman | 35—10.4 |

OTHER REFERENCES

Dummer: Proceedings of the Inistitution of Electrical Engineers, Part 3, March 1949, Paper No. 740, Radio Section, pages 101 to 112 incl.

CHESTER L. JUSTUS, *Primary Examiner.*

MAYNARD R. WILBUR, *Examiner.*

G. M. FISHER, *Assistant Examiner.*